US012579801B2

(12) United States Patent

Miceli

(10) Patent No.: US 12,579,801 B2

(45) Date of Patent: Mar. 17, 2026

(54) SYSTEMS AND METHODS FOR INSPECTION OF UNSTRUCTURED DATA TO IMPROVE ACCEPTABILITY OF DATA PROCESSED USING A COMPUTER VISION MODEL

(71) Applicant: Allstate Insurance Company, Northbrook, IL (US)

(72) Inventor: Tia Miceli, Northbrook, IL (US)

(73) Assignee: Allstate Insurance Company, Northbrook, IL (US)

( * ) Notice: Subject to any disclaimer, the term of this patent is extended or adjusted under 35 U.S.C. 154(b) by 287 days.

(21) Appl. No.: 18/532,194

(22) Filed: Dec. 7, 2023

(65) Prior Publication Data

US 2025/0191365 A1     Jun. 12, 2025

(51) Int. Cl.
*G06V 10/82*        (2022.01)
*G06V 10/74*        (2022.01)
*G06F 16/50*        (2019.01)

(52) U.S. Cl.
CPC .............. *G06V 10/82* (2022.01); *G06V 10/74* (2022.01); *G06F 16/50* (2019.01)

(58) Field of Classification Search
CPC ...... G06V 10/70; G06V 10/74; G06V 10/764; G06V 10/765; G06V 10/82; G06T 7/0002; G06T 2207/20081; G06T 2207/20084; G06T 2207/30156; G06T 2207/30248; G06F 16/20; G06F 16/23; G06F 16/24; G06F 16/50; G06F 16/51; G06F 16/53
See application file for complete search history.

(56) References Cited

U.S. PATENT DOCUMENTS 9,858,496 B2      1/2018   Sun et al.
10,083,403 B2 *   9/2018   Flores ...................... G06N 3/09
(Continued)

FOREIGN PATENT DOCUMENTS

CN        114723945 B   * 10/2024   ......... G06F 18/2415
WO        2019085064 A1    5/2019
(Continued)

OTHER PUBLICATIONS

CNN application-detecting car exterior damage (full implementable code) (https://towardsdatascience.com/cnn-application-detecting-car-exterior-damage-full-implementable-code-1b205e3cb48c). Jun. 21, 2019.

*Primary Examiner* — Scott A Rogers
(74) *Attorney, Agent, or Firm* — Dinsmore & Shohl LLP

(57)     ABSTRACT
A system for computer vision data acceptability analysis and methods of use to receive a plurality of computer vision data comprising data processed via a computer vision model with one or more rules, generate one or more metrics for each of the plurality of computer vision data based on the one or more rules, compare a compared metric of the one or more metrics for each of the plurality of computer vision data to an acceptability threshold, determine the computer vision data to be acceptable when the compared metric associated with the computer vision data is equal to or above the acceptability threshold, generate an overall acceptability score for the plurality of computer vision data, and automatically generate feedback for computer vision model processing based on the overall acceptability score to improve acceptability.

20 Claims, 7 Drawing Sheets

(56)　　　　　　　References Cited

U.S. PATENT DOCUMENTS

| | | | | |
|---|---|---|---|---|
| 10,761,958 | B2 * | 9/2020 | Sobala | G06F 18/24 |
| 10,909,429 | B2 * | 2/2021 | Arilla | G06V 30/194 |
| 11,334,750 | B2 * | 5/2022 | Arilla | G06Q 30/02 |
| 2018/0300576 | A1 | 10/2018 | Dalyac et al. | |
| 2019/0057393 | A1 | 2/2019 | Gorny | |
| 2019/0073537 | A1 | 3/2019 | Arilla et al. | |
| 2019/0095763 | A1 * | 3/2019 | Arilla | G06Q 30/0276 |
| 2020/0193552 | A1 * | 6/2020 | Turkelson | G06F 18/213 |
| 2022/0101182 | A1 * | 3/2022 | Patel | G06N 20/00 |
| 2025/0095347 | A1 * | 3/2025 | Asim | G06N 5/045 |

FOREIGN PATENT DOCUMENTS

| | | | | | |
|---|---|---|---|---|---|
| WO | 2019205391 | A1 | 10/2019 | | |
| WO | WO-2019205376 | A1 * | 10/2019 | | G06F 18/24 |
| WO | WO-2021027157 | A1 * | 2/2021 | | G06N 3/045 |

* cited by examiner

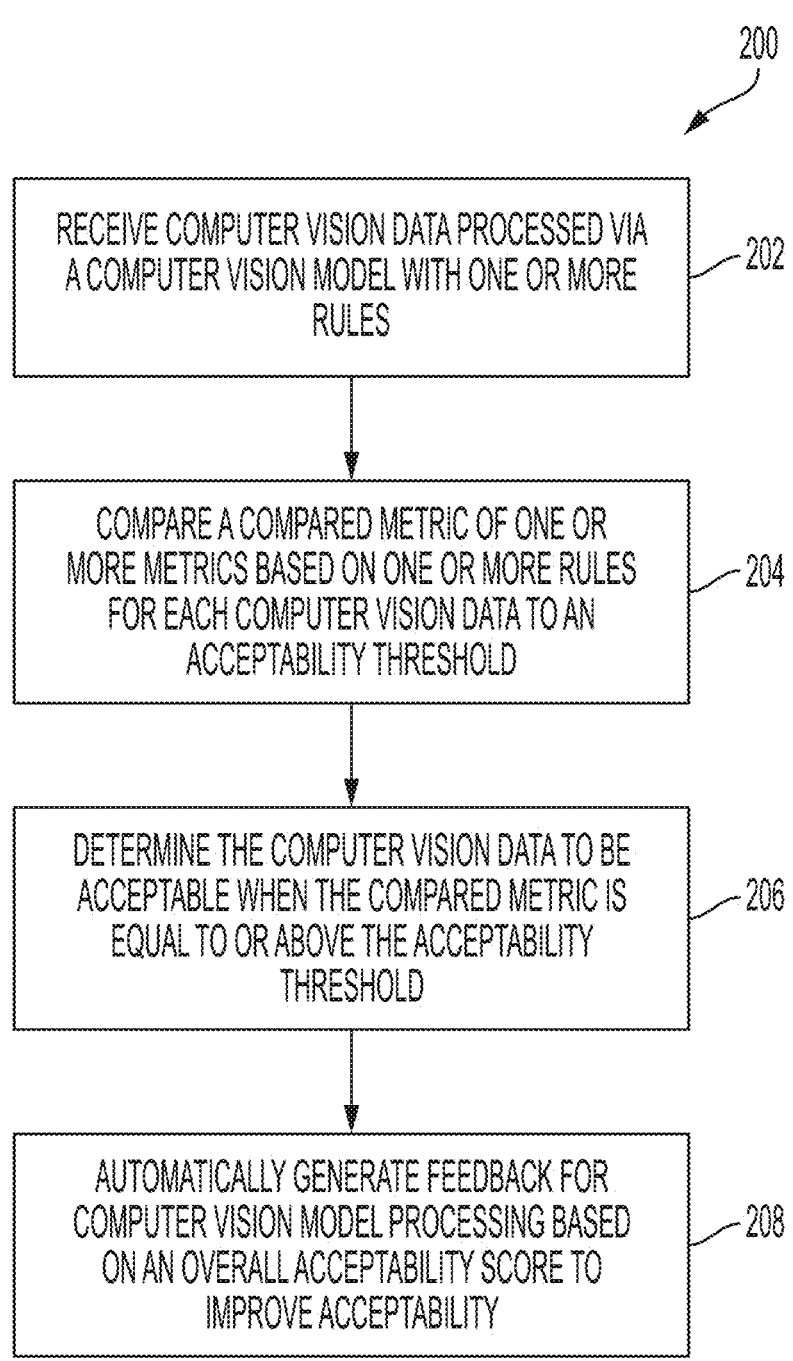

200

RECEIVE COMPUTER VISION DATA PROCESSED VIA A COMPUTER VISION MODEL WITH ONE OR MORE RULES ⟋202

COMPARE A COMPARED METRIC OF ONE OR MORE METRICS BASED ON ONE OR MORE RULES FOR EACH COMPUTER VISION DATA TO AN ACCEPTABILITY THRESHOLD ⟋204

DETERMINE THE COMPUTER VISION DATA TO BE ACCEPTABLE WHEN THE COMPARED METRIC IS EQUAL TO OR ABOVE THE ACCEPTABILITY THRESHOLD ⟋206

AUTOMATICALLY GENERATE FEEDBACK FOR COMPUTER VISION MODEL PROCESSING BASED ON AN OVERALL ACCEPTABILITY SCORE TO IMPROVE ACCEPTABILITY ⟋208

FIG. 6

SYSTEMS AND METHODS FOR INSPECTION OF UNSTRUCTURED DATA TO IMPROVE ACCEPTABILITY OF DATA PROCESSED USING A COMPUTER VISION MODEL

TECHNICAL FIELD

The present disclosure relates to the inspection of unstructured data and, in particular, a system for computer vision data acceptability analysis to organize, filter, and sort based on the acceptability of various metrics from the unstructured data.

BACKGROUND

Analytical analysis may need to be performed on a large sum of photos, documents, or recordings that contain various metrics as unstructured data. Accordingly, a need exists for using a structured data inspector to organize the unstructured data to result in a streamlined analysis of photos, documents, or recordings.

BRIEF SUMMARY

According to the subject matter of the present disclosure, a system for computer vision data acceptability analysis may include one or more processors, one or more memory components communicatively coupled to the one or more processors, and machine readable instructions stored in the one or more memory components. The machine readable instructions may cause the system for computer vision data acceptability analysis to perform at least the following when executed by the one or more processors: receive a plurality of computer visions data comprising data processed via a computer vision model with one or more rules; generate one or more metrics for each of the plurality of computer vision data based on the one or more rules; compare a compared metric of the one or more metrics for each of the plurality of computer vision data to an acceptability threshold; determine the computer vision data to be acceptable when the compared metric associated with the computer vision data is equal to or above the acceptability threshold; generate an overall acceptability score for the plurality of computer vision data; and automatically generate feedback for computer vision model processing based on the overall acceptability score to improve acceptability.

According to another embodiment of the present disclosure, a system for computer vision data acceptability analysis may include one or more processors, one or more memory components communicatively coupled to the one or more processors, and machine readable instructions stored in the one or more memory components. The machine readable instructions may cause the system for computer vision data acceptability analysis to perform at least the following when executed by the one or more processors: receive a plurality of computer vision data comprising data processed via a computer vision model with one or more rules; generate one or more metrics for each of the plurality of computer vision data based on the one or more rules; compare an intersection over union (IOU) metric of the one or more metrics for each of the plurality of computer vision data to an acceptability threshold; filter the plurality of computer vision data based on a selected IOU range to generate filtered data; sort the plurality of computer vision data in increasing order based on the IOU metric and the selected IOU range; determine the computer vision data to be acceptable when the IOU metric associated with the computer vision data is equal to or above the acceptability threshold; generate an overall acceptability score for the plurality of computer vision data; and automatically generate feedback for computer vision model processing based on the overall acceptability score to improve acceptability.

According to yet another embodiment of the present disclosure, a method of implementing a computer vision data acceptability analysis may include receiving a plurality of computer vision data comprising data processed via a computer vision model with one or more rules and generating one or more metrics for each of the plurality of computer vision data based on the one or more rules. The method may further include comparing a compared metric of the one or more metrics for each of the plurality of computer vision data to an acceptability threshold, determining the computer vision data to be acceptable when the compared metric associated with the computer vision data is equal to or above the acceptability threshold, generating an overall acceptability score for the plurality of computer vision data, and automatically generating feedback for computer vision model processing based on the overall acceptability score to improve acceptability.

Although the concepts of the present disclosure are described herein with primary reference to a system for computer vision data acceptability analysis, it is contemplated that the concepts will enjoy applicability to any setting for purposes of data organization, including and not limited to visual, audio, or other like data.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 6 illustrates a flowchart process for the tool for computer vision data acceptability analysis of FIG. 1, according to one or more embodiments shown and described herein;

DETAILED DESCRIPTION

In embodiments described herein, a system for computer vision data acceptability analysis is configured to provide an overall acceptability score for a plurality of computer vision data including annotated images and to automatically generate feedback for computer vision model processing based on the overall acceptability score to improve acceptability of image annotation, as described in greater detail below. Embodiments of the present disclosure are directed to a system for computer vision data acceptability analysis to process a plurality of computer vision data processed by a computer vision model with one or more rules, which is described in greater detail further below. In one or more embodiments, an automated data analytics model described herein is configured to determine acceptability of images processed based on specific rules to determine one or more metrics and automatically provide feedback to improve acceptability outcomes.

Figure 1:
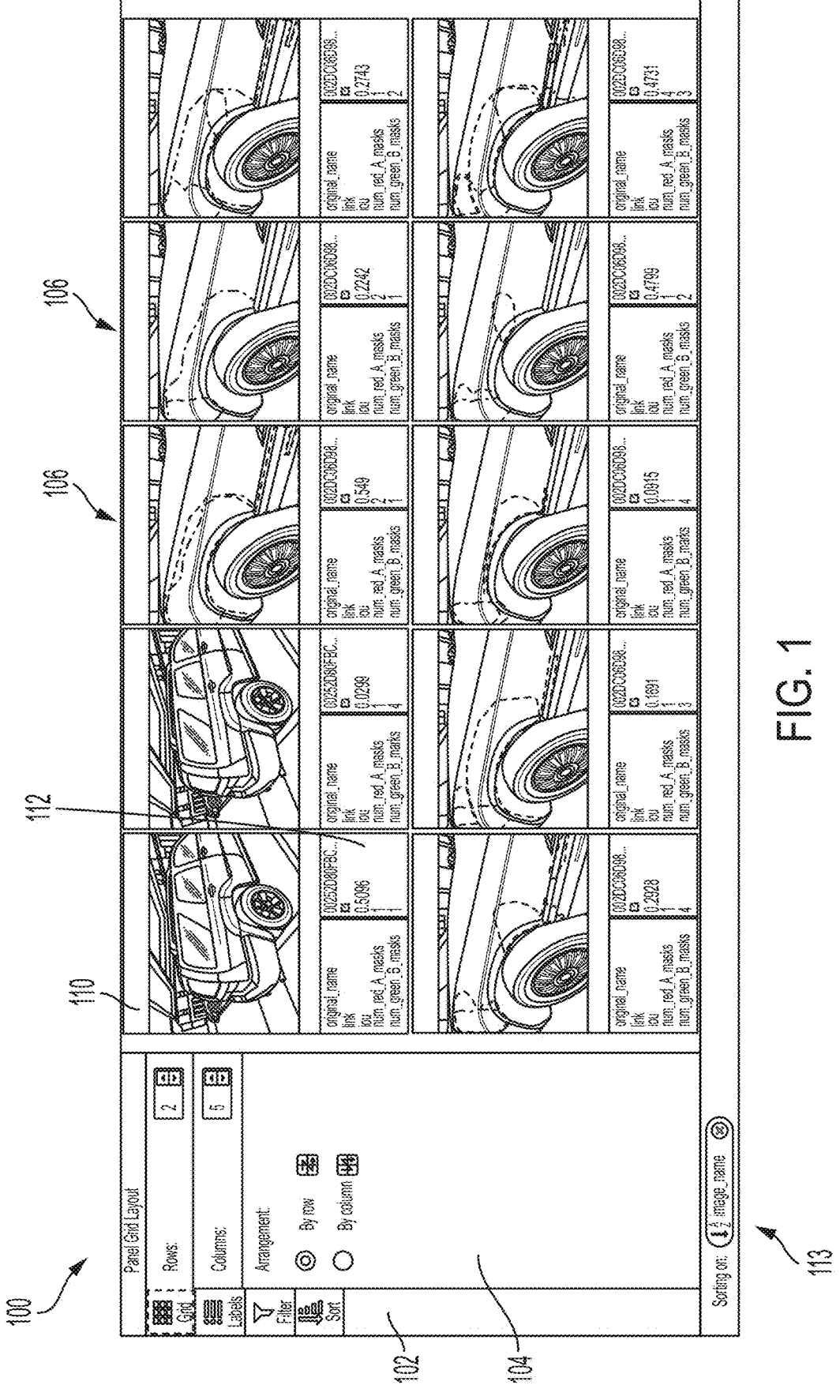
FIG. 1 illustrates a tool for computer vision data acceptability analysis utilizing a plurality of computer vision data to be analyzed with a layout panel selected from a selection panel, according to one or more embodiments shown and described herein.

Referring to FIG. 1, an automated data analytics model includes a tool 100 for computer vision data acceptability analysis. The tool 100 includes a selection panel 102 on a graphical user interface (GUI). The selection panel 102 may include icons representative of options to selection between, such as a layout panel, a label panel, a filter panel, and a sorting panel. The tool 100 also includes a data workspace 104. Loaded image data is displayed as a plurality of computer vision data 106, which has been processed by a computer vision model with one or more rules. The plurality of computer vision data 106 may comprise of image or video data. In additional or alternative embodiments, the plurality of computer vision data 106 may be audio data. The plurality of computer vision data 106 may include individual image data 110. One or more metrics 112 is generated and displayed for each individual image data 110 based on the one or more rules of the computer vision model. The plurality of computer vision data 106 may include one or more virtual masks via which a respective image is annotated to, for example, indicate one or more areas of damage associated with a feature of the respective image, such as where the feature is a vehicle.

The one or more metrics 112 may include an image name, a link to an image associated with the respective individual image data 110, a listed amount of virtual masks of a first color (such as red), and a listed amount of virtual masks of a second color (such as green). The virtual masks may be of a variety of shapes, such as polygons. The one or more metrics 112 may also include an intersection over union (IOU), which is the ratio of overlap of an area of the first color virtual masks and second color virtual masks (e.g., red and green polygons in FIG. 1) over the total combined area of the number of the first and second color virtual masks.

The data workspace 104 may be utilized to arrange the plurality of computer vision data 106. For example, utilizing the layout panel, the plurality of computer vision data 106 may be arranged in two rows by five columns, or other desired formats. A ranking panel 113 displays sorting and filtering criteria that may be used to organize the plurality computer vision data 106 (as illustrated and described in greater detail further below in FIGS. 3-5).

Figure 2:
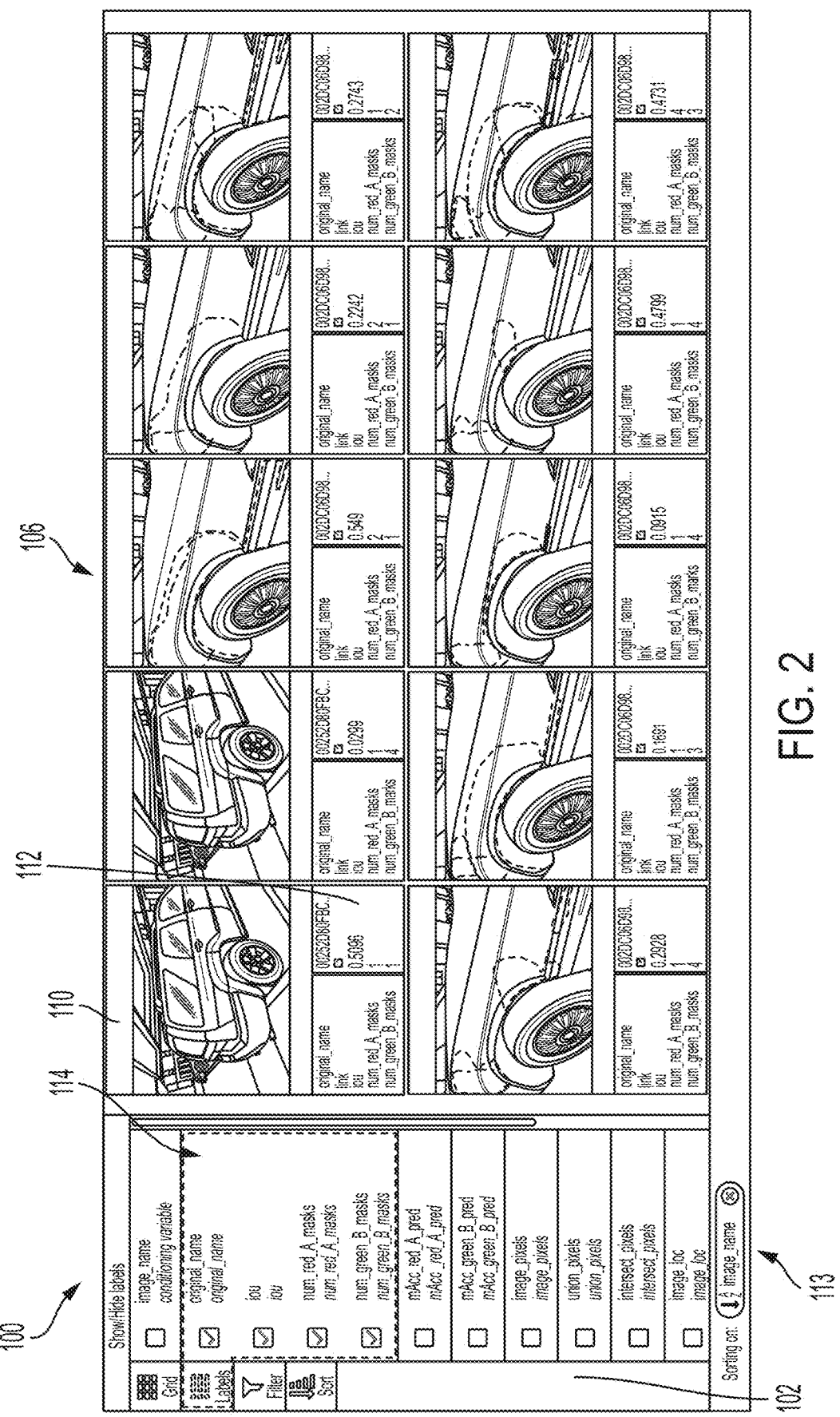
FIG. 2 illustrates the tool for computer vision data acceptability analysis of FIG. 1, wherein a label panel is selected from the selection panel, according to one or more embodiments shown and described herein.

Referring to FIG. 2, the tool 100 includes a label panel as selected from an associated icon on the selection panel 102. The label panel allows for a selection of which of the one or metrics 112 is displayed for each individual image data 110.

A different set of the one or more metrics 112 can be selected via a metric window 114 depending upon what the user intends to filter, sort, or observe from the plurality of computer vision data 106.

Figure 3:
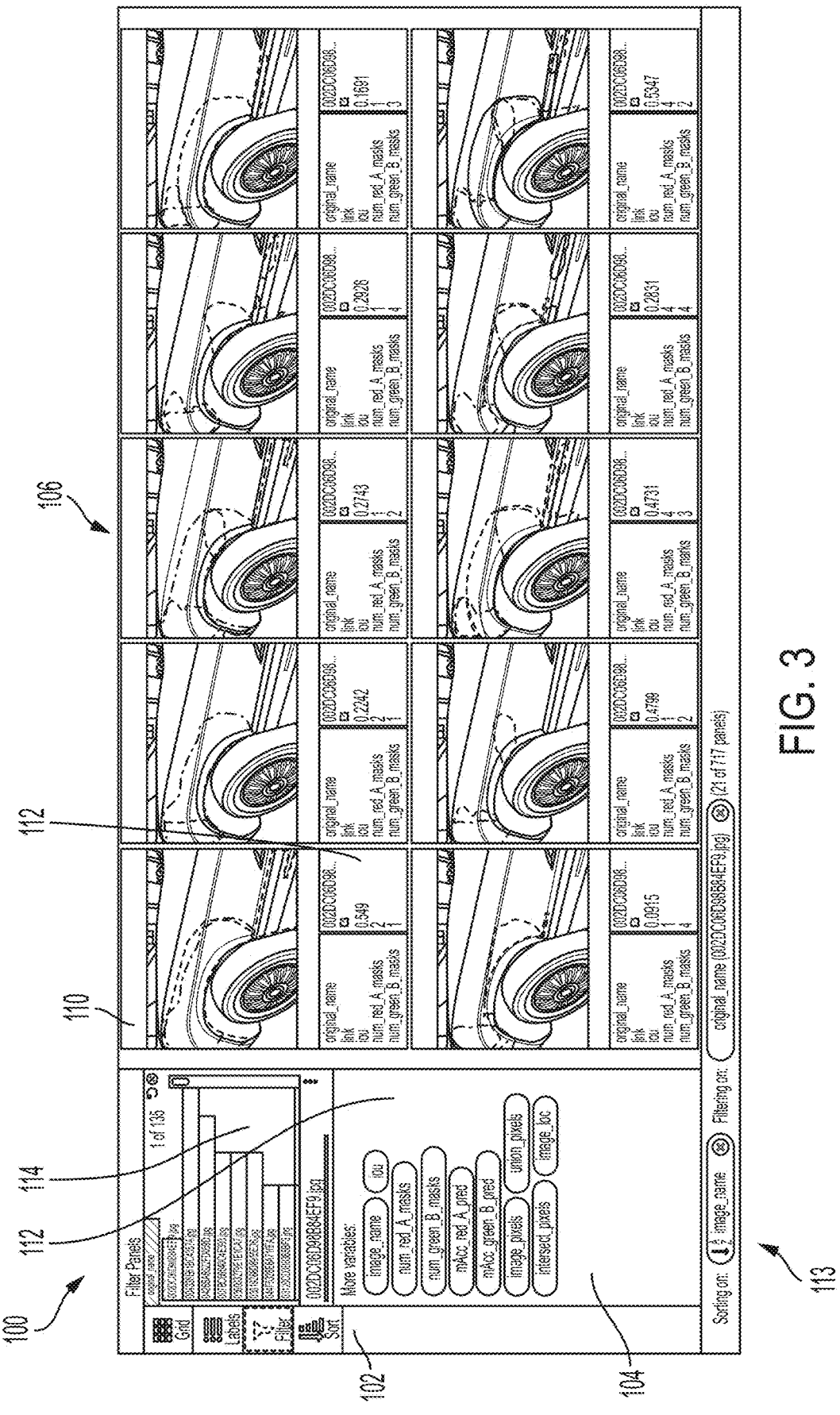
FIG. 3 illustrates the tool for computer vision data acceptability analysis of FIG. 1, wherein the filter panel is selected from the selection panel, according to one or more embodiments shown and described herein.

Referring to FIG. 3, the tool 100 includes a filter panel as selected from an associated icon on the selection panel 102. The filter panel may be utilized to display a filter selection for a selected individual image data 110 to include specific, selected one or more metrics 112 as selected variables or attributes. The one or more metrics 112 that the plurality of computer vision data 106 is filtered upon are displayed in the data workspace 104. Once the one or more metrics 112 are selected, a metric window 114 is displayed in the data workspace 104. From the metric window 114, certain attributes of the one or more metrics 112 can be selected. Once a particular attribute is selected, only individual image data 110 with the one or more metrics 112 matching that attribute may be displayed.

The ranking panel 113 may display filtering criteria selected from the filter panel, such as the selected individual image data, to allow for a viewing of how the plurality of computer vision data 106 is filtered or sorted. In FIG. 3, the plurality of computer vision data 106 is being filtered based upon original name of a .jpg file (having an image name) associated with the selected individual image data 110, with a sorting applied to image name of the .jpg files. Thus only images associated with selected original name are shown.

Figure 4:
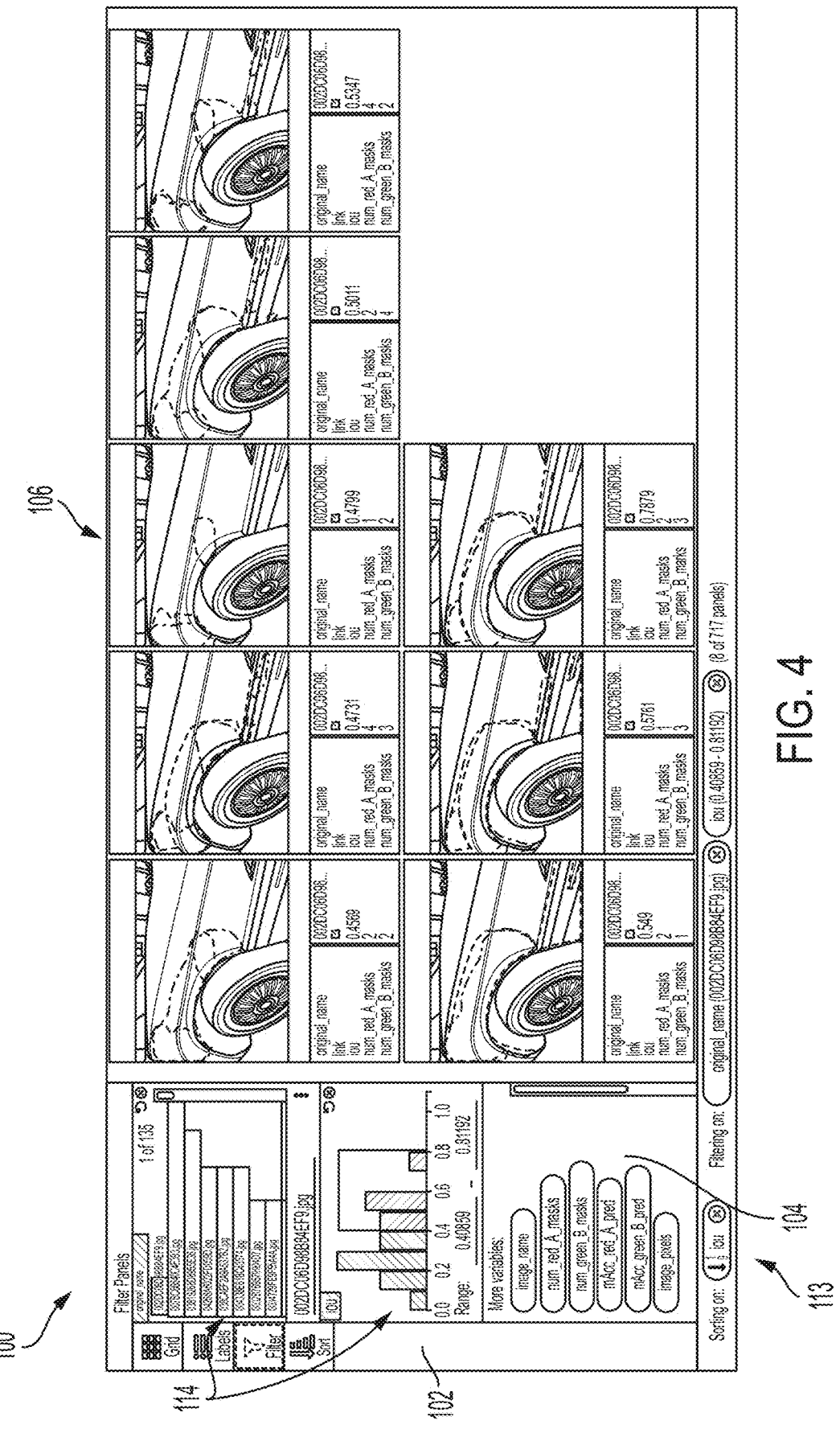
FIG. 4 illustrates the tool for computer vision data acceptability analysis of FIG. 1, wherein multiple filters are selected from the filter panel, according to one or more embodiments shown and described herein.

Referring to FIG. 4, multiple of the one or more metrics 112 can be selected as filters in the data workspace 104 to further narrow the display of images and metrics shown. Thus, the matching individual image data 110 can be further filtered by selecting certain attributes or ranges within the one or more metrics 112. As a non-limiting example, a filter may be applied in which only individual image data 110 is displayed that has an IOU of 0.4 or above as one of the one or more metrics 112.

Figure 5:
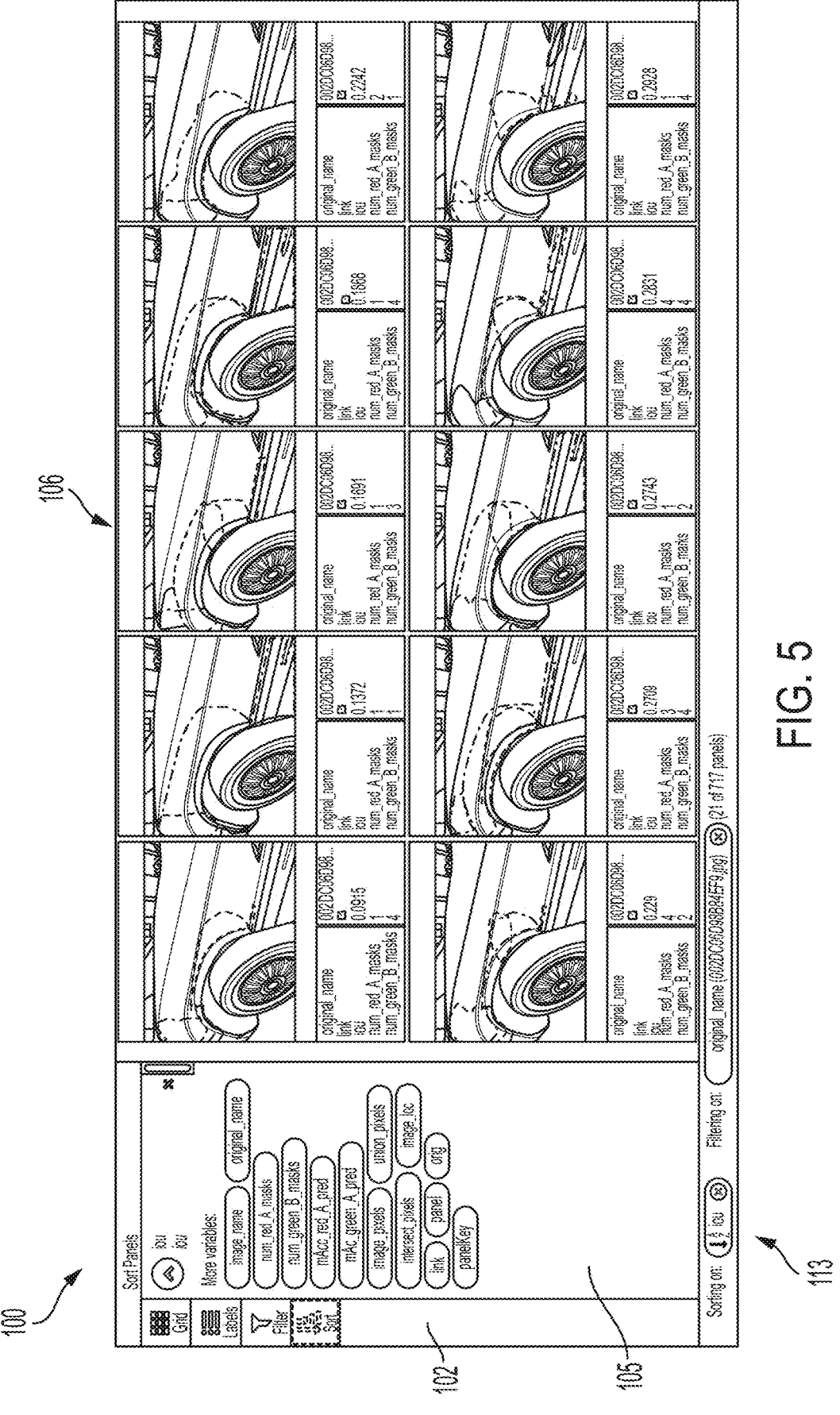
FIG. 5 illustrates the tool for computer vision data acceptability analysis of FIG. 1, wherein a sorting panel is selected from the selection panel, according to one or more embodiments shown and described herein.

Referring to FIG. 5, the tool 100 includes a sorting panel as selected from an associated icon on the selection panel 102. The sorting panel allows the plurality of computer vision data 106 displayed after filtering as described above to further be organized based on the one or more metrics 112. This organization allows for ease of analyzation of the plurality of computer vision data 106. As illustrated in FIG. 5, the filtered plurality of computer vision data 106 displayed can be organized and sorted based on ascending IOU from lowest to highest. In embodiments, an individual image data 110 with a high IOU may be regarded as a more acceptable than an individual image data 110 with a lower IOU. The plurality of computer vision data 106 can be sorted based on any of the one or more metrics 112.

Once the plurality of computer vision data 106 is organized by the tool 100 as described herein, the tool 100 may be configured to analyze the filtered and sorted plurality of computer vision data 106 to determine which individual image data 110 of the displayed plurality of computer vision data 106 are acceptable. Which individual image data 110 is acceptable may be dependent on the one or more metrics 112 of the entire set of the plurality of computer vision data 106. By way of example, and not as a limitation, an individual image data 110 with an IOU of 0.2 may be acceptable when the highest IOU among the plurality of computer vision data 106 is 0.3. However, an individual image data 110 with an IOU of 0.2 may be unacceptable when the average IOU among the plurality of computer vision data 106 is 0.8. Which individual image data 110 are acceptable among a particular plurality of computer vision data 106 can be determined by a user and/or automatically by a computer program of the tool 100.

Referring to FIG. 6, an embodiment of a process 200 is shown for use of the tool 100 of FIGS. 1-5 (as implemented by an intelligent acceptability system 300 of FIG. 7, described in greater detail below). In block 202, the plurality of computer vision data 106, which is processed via a person or the computer vision model with one or more rules, is received by the intelligent acceptability system 300. The intelligent acceptability system 300 may include machine readable instructions that cause it to remotely connect to a data folder containing the plurality of computer vision data 106 for receipt. Once received, the intelligent acceptability system 300 generates the one or more metrics 112. The one or more metrics 112 may be generated for each of the individual image data 110 based on the one or more rules.

The plurality of computer vision data 106 may include virtual masks that are generated by a person, a computer vision model, a combination thereof, or the like. The virtual masks may be indicative of damage to a vehicle or other image characteristics.

In block 204, a compared metric of the one or more metrics 112 for each of the plurality of computer vision data 106 is compared to an acceptability threshold. As a non-limiting example, and as described above, an individual image data 110 with an IOU of 0.2 may be unacceptable when the average IOU among the plurality of computer vision data 106 is 0.8, where 0.8 may be set as the acceptability threshold.

In block 206, the compared metric is determined to be acceptable if the compared metric is equal to or above an acceptability threshold. As another non-limiting example, the process 200 may only determine the compared metric to be acceptable if it has an IOU of 0.4 or above. Individual image data 110 with compared metrics that are determined to be acceptable may be displayed on GUI of the tool 100, while individual image data 110 with compared metrics that are determined to be unacceptable may be rejected and not displayed on the GUI. Further, an overall acceptability score may be generated for the plurality of computer vision data 106. The plurality of computer vision data 106 may be evaluated to generate an overall acceptability score based on how many of the one or more metrics 112 are acceptable. The overall acceptability score may be based on the ratio of the acceptable to unacceptable individual image data 110, or other like ratios.

In block 208, feedback for computer vision model processing based on the overall acceptability score to improve acceptability may automatically generated by the tool 100. In embodiments, a provider (the person and/or a computer vision model of the tool 100) of the plurality of computer vision data 106 could be notified of the overall acceptability score associated with that plurality of computer vision data 106, and the provider could improve its overall acceptability score ongoing based on the feedback.

Figure 7:
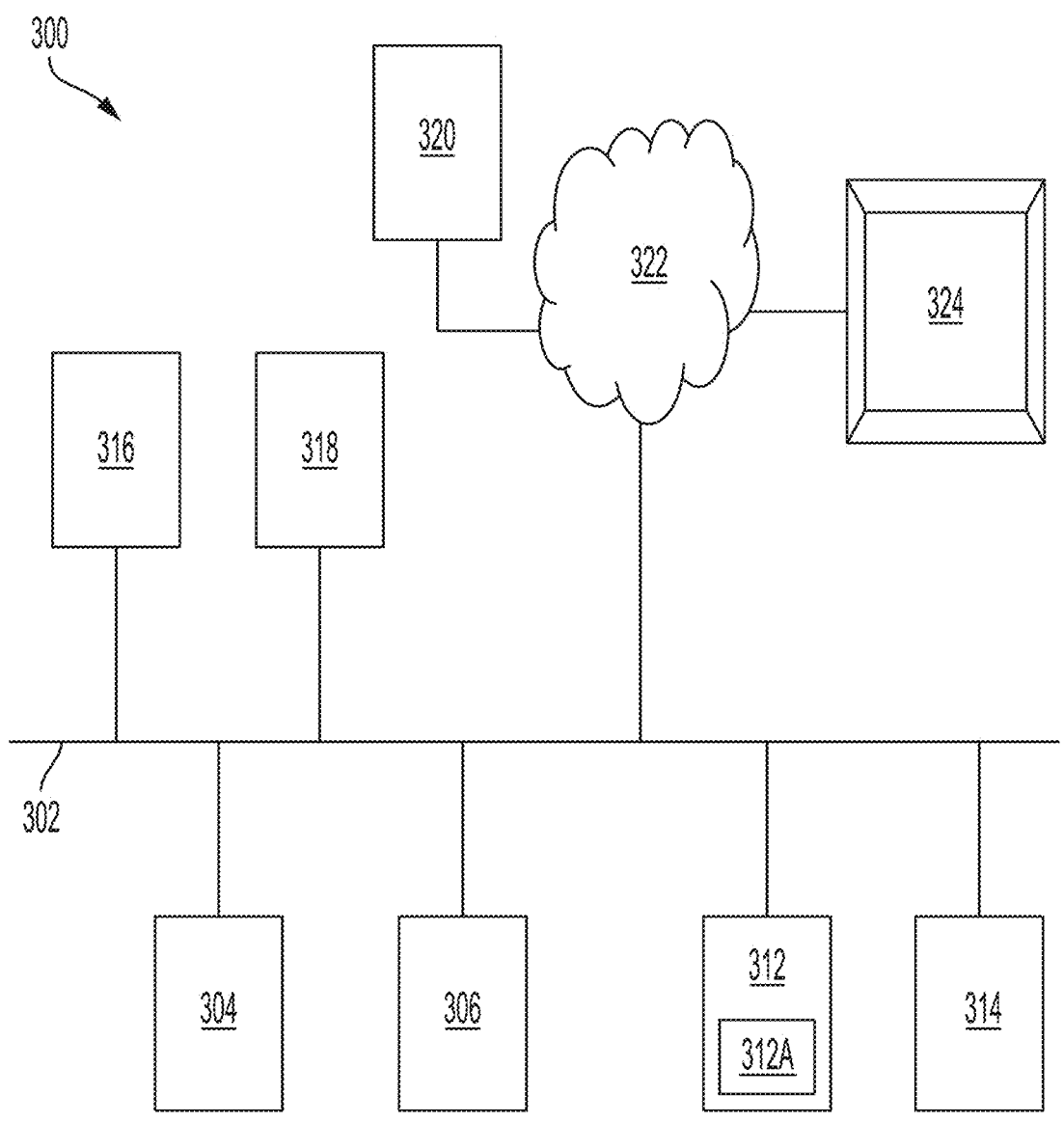
FIG. 7 illustrates a computer implemented system including an intelligent acceptability system for use with the process flow of FIG. 6 and the tool for computer vision data acceptability analysis of FIG. 1, according to one or more embodiments shown and described herein.

FIG. 7 illustrates a computer implemented intelligent acceptability system 300 for use with the process 200 of FIG. 6. Referring to FIG. 7, a non-transitory, intelligent acceptability system 300 for implementing a computer and software-based method, such as directed by the tool 100 and the process 200, to determine the overall acceptability score to improve acceptability of the plurality of computer vision data 106 as described herein. The intelligent acceptability system 300 comprises a communication path 302, one or more processors 304, a non-transitory memory component 306, an intelligent acceptability module 312, a data contextualization sub-module 312A of the intelligent acceptability module 312, a storage or database 314, a machine learning module 316, a network interface hardware 318, a network 322, a server 320, and a computing device 324. The various components of the intelligent acceptability system 300 and the interaction thereof will be described in detail below.

While only one server 320 and one computing device 324 are illustrated, the intelligent acceptability system 300 can comprise multiple servers containing one or more applications and computing devices. In some embodiments, the intelligent acceptability system 300 is implemented using a wide area network (WAN) or network 322, such as an intranet or the internet. The computing device 324 may include digital systems and other devices permitting connection to and navigation of the network. It is contemplated and within the scope of this disclosure that the computing device 324 may be a personal computer, a laptop device, a smart mobile device such as a smart phone or smart pad, or the like. Other intelligent acceptability system 300 variations allowing for communication between various geographically diverse components are possible. The lines depicted in FIG. 7 indicate communication rather than physical connections between the various components.

The intelligent acceptability system 300 comprises the communication path 302. The communication path 302 may be formed from any medium that is capable of transmitting a signal such as, for example, conductive wires, conductive traces, optical waveguides, or the like, or from a combination of mediums capable of transmitting signals. The communication path 302 communicatively couples the various components of the intelligent acceptability system 300. As used herein, the term "communicatively coupled" means that coupled components are capable of exchanging data signals with one another such as, for example, electrical signals via conductive medium, electromagnetic signals via air, optical signals via optical waveguides, and the like.

The intelligent acceptability system 300 of FIG. 7 also comprises the processor 304. The processor 304 can be any device capable of executing machine readable instructions. Accordingly, the processor 304 may be a controller, an integrated circuit, a microchip, a computer, or any other computing device. The processor 304 is communicatively coupled to the other components of the intelligent acceptability system 300 by the communication path 302. Accordingly, the communication path 302 may communicatively couple any number of processors with one another, and allow the modules coupled to the communication path 302 to operate in a distributed computing environment. Specifically, each of the modules can operate as a node that may send and/or receive data.

The illustrated intelligent acceptability system 300 further comprises the memory component 306 which is coupled to the communication path 302 and communicatively coupled to the processor 304. The memory component 306 may be a non-transitory computer readable medium or non-transitory computer readable memory and may be configured as a nonvolatile computer readable medium. The memory component 306 may comprise RAM, ROM, flash memories, hard drives, or any device capable of storing machine readable instructions such that the machine readable instructions can be accessed and executed by the processor 304. The machine readable instructions may comprise logic or algorithm(s) written in any programming language such as, for example, machine language that may be directly executed by the processor 304, or assembly language, object-oriented programming (OOP), scripting languages, microcode, etc., that may be compiled or assembled into machine readable instructions and stored on the memory component 306. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 7, as noted above, the intelligent acceptability system 300 comprises the display such as the GUI on a screen of the computing device 324 for providing visual output such as, for example, information, graphical reports, messages, or a combination thereof. The display on the screen of the computing device 324 is coupled to the communication path 302 and communicatively coupled to the processor 304. Accordingly, the communication path 302 communicatively couples the display to other modules of the intelligent acceptability system 300. The display can comprise any medium capable of transmitting an optical output such as, for example, a cathode ray tube, light emitting diodes, a liquid crystal display, a plasma display, or the like. Additionally, it is noted that the display or the computing device 324 can comprise at least one of the processor 304 and the memory component 306. While the intelligent acceptability system 300 is illustrated as a single, integrated system in FIG. 7, in other embodiments, the systems can be independent systems.

The intelligent acceptability system 300 comprises the intelligent acceptability module 312 as described above to at least generate a plurality of acceptability scores for the plurality of computer vision data 106 based upon the compared metrics and the acceptability threshold, the data contextualization sub-module 312A to provide contextual data for the plurality of computer vision data 106 such as through the one or more metrics 112, and the machine learning module 316 for generating the overall acceptability score that is machine learned and adjustable for the plurality of acceptability scores and the acceptability threshold. The machine learning module 316 may include an artificial intelligence component to train and provide machine learning capabilities to a neural network as described herein.

As set forth above, certain compared metrics may have to exceed the acceptability threshold prior to the individual image data 110 being displayed on the display of the computing device 324. As a non-limiting example, the IOU of the individual image data 110 is used as a compared metric. In an embodiment, if the IOU of the individual image data 110 is equal to or above 0.4 (the acceptability threshold), the individual image data 110 will be displayed. Further, after the plurality of computer vision data 106 has been filtered based on the acceptability threshold, the filtered plurality of computer vision data 106 may be sorted from increasing to decreasing IOU. The machine learning module 316 may generate an overall acceptability score and parameters used by the machine learning module 316 may not be static predetermined parameters, but parameters that are machine learned and adjustable to be dynamic parameters based on the plurality of acceptability scores of a particular plurality of computer vision data 106. For instance, as more data is added to the database 314, from which the overall acceptability score is determined, the overall acceptability score may be adjusted to be more accurate in view of the updated data set and based on one or more parameters used to calculate the overall acceptability score.

The intelligent acceptability module 312, the data contextualization sub-module 312A, and the machine learning module 316 are coupled to the communication path 302 and communicatively coupled to the processor 304. As will be described in further detail below, the processor 304 may process the input signals received from the system modules and/or extract information from such signals.

Data stored and manipulated in the intelligent acceptability system 300 as described herein is utilized by the machine learning module 316, which is able to leverage a cloud computing-based network configuration such as the cloud to apply Machine Learning and Artificial Intelligence. This machine learning application may create models that can be applied by the intelligent acceptability system 300, to make it more efficient and intelligent in execution. As an example and not a limitation, the machine learning module 316 may include artificial intelligence components selected from the group consisting of an artificial intelligence engine, Bayesian inference engine, and a decision-making engine, and may have an adaptive learning engine further comprising a deep neural network learning engine.

The intelligent acceptability system 300 comprises the network interface hardware 318 for communicatively coupling the intelligent acceptability system 300 with a computer network such as network 322. The network interface hardware 318 is coupled to the communication path 302 such that the communication path 302 communicatively couples the network interface hardware 318 to other modules of the intelligent acceptability system 300. The network interface hardware 318 can be any device capable of transmitting and/or receiving data via a wireless network. Accordingly, the network interface hardware 318 can comprise a communication transceiver for sending and/or receiving data according to any wireless communication standard. For example, the network interface hardware 318 can comprise a chipset (e.g., antenna, processors, machine readable instructions, etc.) to communicate over wired and/or wireless computer networks such as, for example, wireless fidelity (Wi-Fi), WiMax, Bluetooth, IrDA, Wireless USB, Z-Wave, ZigBee, or the like.

Still referring to FIG. 7, data from various applications running on computing device 324 can be provided from the computing device 324 to the intelligent acceptability system 300 via the network interface hardware 318. The computing device 324 can be any device having hardware (e.g., chipsets, processors, memory, etc.) for communicatively coupling with the network interface hardware 318 and a network 322. Specifically, the computing device 324 can comprise an input device having an antenna for communicating over one or more of the wireless computer networks described above.

The network 322 can comprise any wired and/or wireless network such as, for example, wide area networks, metropolitan area networks, the internet, an intranet, satellite networks, or the like. Accordingly, the network 322 can be utilized as a wireless access point by the computing device 324 to access one or more servers (e.g., a server 320). The server 320 and any additional servers generally comprise processors, memory, and chipset for delivering resources via the network 322. Resources can include providing, for example, processing, storage, software, and information from the server 320 to the intelligent acceptability system 300 via the network 322. Additionally, it is noted that the server 320 and any additional servers can share resources with one another over the network 322 such as, for example, via the wired portion of the network, the wireless portion of the network, or combinations thereof.

In embodiments, the intelligent acceptability systems and methods as described herein assist to significantly reduce inefficiencies associated with the structuring of unstructured data by efficiently filtering and sorting a plurality of computer vision data. As a non-limiting example, such a plurality of computer vision data may be received from a computer vision model and evaluated for an overall acceptability score. The intelligent acceptability systems and methods provide a more efficient processing system to filter, organize, and sort the plurality of computer vision data to determine the acceptability at a speedier rate, which assist to reduce an amount of time spent by a machine or person analyzing the plurality of computer vision data. Data analytic insights, such as those associated with overall acceptability scores for different pluralities of computer vision data, are integrated. Further, machine learning techniques based on such data analytics, which may include a plurality of acceptability scores from the plurality of computer vision data, for instance, may be utilized to generate a more accurate acceptability score in light of the plurality of acceptability scores.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use.

It is noted that terms like "preferably," "commonly," and "typically," when utilized herein, are not utilized to limit the scope of the claimed disclosure or to imply that certain features are critical, essential, or even important to the structure or function of the claimed disclosure. Rather, these terms are merely intended to identify particular aspects of an embodiment of the present disclosure or to emphasize alternative or additional features that may or may not be utilized in a particular embodiment of the present disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

ASPECTS LISTING

Aspect 1. A system for computer vision data acceptability analysis including one or more processors, one or more memory components communicatively coupled to the one or more processors, and machine readable instructions stored in the one or more memory components. The machine readable instructions cause the system for computer vision data acceptability analysis to perform at least the following when executed by the one or more processors: receive a plurality of computer vision data processed via a computer vision model with one or more rules, generate one or more metrics for each of the plurality of computer vision based on the one or more rules, compare a compared metric of the one or more metrics for each of the plurality of computer vision data to an acceptability threshold, determine the computer vision data to be acceptable when the compared metric associated with the computer vision data is equal to or above the acceptability threshold, generate an overall acceptability score for the plurality of computer vision data, and automatically generate feedback for computer vision model processing based on the overall acceptability score to improve acceptability.

Aspect 2. The system for computer vision data acceptability analysis of Aspect 1, wherein the overall acceptability score comprises a ratio of the acceptable to unacceptable computer vision data.

Aspect 3. The system for computer vision data acceptability analysis of Aspect 1 or Aspect 2, further including machine readable instructions that cause the system to perform at least the following when executed by the one or more processors: filter the plurality of computer vision data based on one or more variables to generate filtered data and sort the filtered data to rank the filtered data based on at least one of the one or more metrics.

Aspect 4. The system for computer vision data acceptability analysis of any of Aspect 1 to Aspect 3, further including machine readable instructions that cause the system to perform at least the following when executed by the one or more processors: display the overall acceptability score compared to previous accountability scores to track and improve accountability of the computer vision model.

Aspect 5. The system for computer vision data acceptability analysis of any of Aspect 1 to Aspect 4, wherein the at least two virtual masks are generated by a person, the computer vision model, or combinations thereof.

Aspect 6. The system for computer vision data acceptability analysis of any of Aspect 5, wherein the at least two virtual masks are generated by a person, the computer vision model, or combinations thereof.

Aspect 7. The system for computer vision data acceptability analysis of Aspect 5 or Aspect 6, wherein the plurality of images capture images of a vehicle, and the at least two virtual masks are indicative of areas of damage to the vehicle.

Aspect 8. The system for computer vision data acceptability analysis of any Aspect 1 to Aspect 7, wherein the compared metric for each image is an intersection over union (IOU) metric.

Aspect 9. The system for computer vision data acceptability analysis of any Aspect 1 to Aspect 8, wherein the acceptability threshold is 0.4.

Aspect 10. The system for computer vision data acceptability analysis of any Aspect 1 to Aspect 9, further including machine readable instructions that cause the system to perform at least the following when executed by the one or more processors: filter the plurality of computer vision data based on a selected IOU range to generate filtered data, and sort the plurality of computer vision data in increasing order based on the IOU metric and the selected IOU range.

Aspect 11. A system for computer vision data acceptability analysis including one or more processors, one or more memory components communicatively coupled to the one or more processors, and machine readable instructions stored in the one or more memory components. The machine readable instructions cause the system for computer vision data acceptability analysis to perform at least the following when executed by the one or more processors: receive a plurality of computer vision data comprising data processed via a computer vision model with one or more rules, generate one or more metrics for each of the plurality of computer vision data based on the one or more rules, compare an intersection over union (IOU) metric of the one or more metrics for each of the plurality of computer vision data to an acceptability threshold, filter the plurality of computer vision data based on a selected IOU range to generate filtered data, sort the plurality of computer vision data in increasing order based on the IOU metric and the selected IOU range; determine the computer vision data to be acceptable when the IOU metric associated with the computer vision data is equal to or above the acceptability threshold, generate an overall acceptability score for the plurality of computer vision data, and automatically generate feedback for computer vision model processing based on the overall acceptability score to improve acceptability.

Aspect 12. The system for computer vision data acceptability analysis of any Aspect 1 to Aspect 11, further including machine readable instructions that cause the system to perform at least the following when executed by the one or more processors: remotely connect to a data folder, the data folder storing the plurality of computer vision data, select one or more metric labels associated with the one or more metrics, and display the one or more metrics of the selected one or more metric labels with the plurality of computer vision data.

Aspect 13. A method of implementing a computer vision data acceptability analysis, the method including: receiving a plurality of computer vision data comprising data processed via a computer vision model with one or more rules, generating one or more metrics for each of the plurality of computer vision data based on the one or more rules, generating a confidence level with the intelligent router module for each call reason prediction of the plurality of call reason predictions, comparing a compared metric of the one or more metrics for each of the plurality of computer vision data to an acceptability threshold, determining the computer vision data to be acceptable when the compared metric associated with the computer vision data is equal to or above the acceptability threshold, generating an overall acceptability score for the plurality of computer vision data, and automatically generating feedback for computer vision model processing based on the overall acceptability score to improve acceptability.

Aspect 14. The method of Aspect 13, further including: filtering the plurality of computer vision data based on one or more variables to generate filtered data and sorting the filtered data to rank the filtered data based on at least one of the one or more metrics.

Aspect 15. The method of Aspect 12 or Aspect 13, further including displaying the overall acceptability score compared to previous accountability scores to track and improve accountability of the computer vision mode.

Aspect 16. The method of Aspect 11 to Aspect 13, wherein the plurality of computer vision data comprises a plurality of images superimposed by at least two virtual masks, and the plurality of images capture images of a vehicle, and the at least two virtual masks are indicative of areas of damage to the vehicle.

Aspect 17. The method of Aspect 18, wherein the compared metric for each image is an intersection over union (IOU) metric, and the acceptability threshold is 0.4.

What is claimed is:

1. A system for computer vision data acceptability analysis, the system comprising:
one or more processors;
one or more memory components communicatively coupled to the one or more processors; and
machine readable instructions stored in the one or more memory components that cause the system to perform at least the following when executed by the one or more processors:
receive a plurality of computer vision data comprising data processed via a computer vision model with one or more rules;
generate one or more metrics for each of the plurality of computer vision data based on the one or more rules;
compare a compared metric of the one or more metrics for each of the plurality of computer vision data to an acceptability threshold;
determine the computer vision data to be acceptable when the compared metric associated with the computer vision data is equal to or above the acceptability threshold;
generate an overall acceptability score for the plurality of computer vision data; and
automatically generate feedback for computer vision model processing based on the overall acceptability score to improve acceptability.

2. The system of claim 1, wherein the overall acceptability score comprises a ratio of the acceptable to unacceptable computer vision data.

3. The system of claim 1, further comprising machine readable instructions that cause the system to perform at least the following when executed by the one or more processors:
filter the plurality of computer vision data based on one or more variables to generate filtered data; and
sort the filtered data to rank the filtered data based on at least one of the one or more metrics.

4. The system of claim 1, further comprising machine readable instructions that cause the system to perform at least the following when executed by the one or more processors:
display the overall acceptability score compared to previous accountability scores to track and improve accountability of the computer vision model.

5. The system of claim 1, wherein the plurality of computer vision data comprises a plurality of images superimposed by at least two virtual masks.

6. The system of claim 5, wherein the at least two virtual masks are generated by a person, the computer vision model, or combinations thereof.

7. The system of claim 5, wherein the plurality of images capture images of a vehicle, and the at least two virtual masks are indicative of areas of damage to the vehicle.

8. The system of claim 7, wherein the compared metric for each image is an intersection over union (IOU) metric.

9. The system of claim 8, wherein the acceptability threshold is 0.4.

10. The system of claim 1, wherein the compared metric for each of the plurality of computer vision data is an intersection over union (IOU) metric.

11. The system of claim 10, wherein the acceptability threshold is 0.4.

12. The system of claim 11, further comprising machine readable instructions that cause the system to perform at least the following when executed by the one or more processors:
  filter the plurality of computer vision data based on a selected IOU range to generate filtered data; and
  sort the plurality of computer vision data in increasing order based on the IOU metric and the selected IOU range.

13. The system of claim 1, further comprising machine readable instructions that cause the system to perform at least the following when executed by the one or more processors:
  remotely connect to a data folder, the data folder storing the plurality of computer vision data;
  select one or more metric labels associated with the one or more metrics; and
  display the one or more metrics of the selected one or more metric labels with the plurality of computer vision data.

14. A system for computer vision data acceptability analysis, the system comprising:
  one or more processors;
  one or more memory components communicatively coupled to the one or more processors; and
  machine readable instructions stored in the one or more memory components that cause the system to perform at least the following when executed by the one or more processors:
    receive a plurality of computer vision data comprising data processed via a computer vision model with one or more rules;
    generate one or more metrics for each of the plurality of computer vision data based on the one or more rules;
    compare an intersection over union (IOU) metric of the one or more metrics for each of the plurality of computer vision data to an acceptability threshold;
    filter the plurality of computer vision data based on a selected IOU range to generate filtered data;
    sort the plurality of computer vision data in increasing order based on the IOU metric and the selected IOU range;

determine the computer vision data to be acceptable when the IOU metric associated with the computer vision data is equal to or above the acceptability threshold;
    generate an overall acceptability score for the plurality of computer vision data; and
    automatically generate feedback for computer vision model processing based on the overall acceptability score to improve acceptability.

15. The system of claim 14, further comprising machine readable instructions that cause the system to perform at least the following when executed by the one or more processors:
  remotely connect to a data folder, the data folder storing the plurality of computer vision data;
  select one or more metric labels associated with the one or more metrics; and
  display the one or more metrics of the selected one or more metric labels with the plurality of computer vision data.

16. A method of implementing a computer vision data acceptability analysis, the method comprising:
  receiving a plurality of computer vision data comprising data processed via a computer vision model with one or more rules;
  generating one or more metrics for each of the plurality of computer vision data based on the one or more rules;
  comparing a compared metric of the one or more metrics for each of the plurality of computer vision data to an acceptability threshold;
  determining the computer vision data to be acceptable when the compared metric associated with the computer vision data is equal to or above the acceptability threshold;
  generating an overall acceptability score for the plurality of computer vision data; and
  automatically generating feedback for computer vision model processing based on the overall acceptability score to improve acceptability.

17. The method of claim 16, further comprising:
  filtering the plurality of computer vision data based on one or more variables to generate filtered data; and
  sorting the filtered data to rank the filtered data based on at least one of the one or more metrics.

18. The method of claim 16, further comprising displaying the overall acceptability score compared to previous accountability scores to track and improve accountability of the computer vision data.

19. The method of claim 16, wherein the plurality of computer vision data comprises a plurality of images superimposed by at least two virtual masks, and the plurality of images capture images of a vehicle, and the at least two virtual masks are indicative of areas of damage to the vehicle.

20. The method of claim 19, wherein the compared metric for each image is an intersection over union (IOU) metric, and the acceptability threshold is 0.4.

* * * * *